May 31, 1966 T. E. EINSELE 3,254,269

READOUT DEVICE FOR COMPUTER SYSTEMS

Filed Dec. 17, 1958

INVENTOR
THEODOR EINSELE
BY G. R. Gugger
AGENT

United States Patent Office 3,254,269

Patented May 31, 1966

3,254,269

READOUT DEVICE FOR COMPUTER SYSTEMS

Theodor E. Einsele, Sindelfingen, Germany, assignor to International Business Machines Corporation, New York, N.Y., a corporation of New York Filed Dec. 17, 1958, Ser. No. 781,005

Claims priority, application Germany, Jan. 30, 1958, I 14,336

3 Claims. (Cl. 317—155.5)

This invention relates to a readout device for computer systems or the like and more particularly to a circuit arrangement wherein a relay may be turned on through a transistor by means of short pulses.

The prior art in the past has included circuit arrangements wherein a relay may be turned on through a transistor by means of short pulses and, in particular, circuits which permit the pickup of a relay by pulses essentially shorter than the pickup time of the relay. Such circuit arrangements have, for the most part, operated with bistable multivibrators comprising a point contact transistor or two junction transistors with the relay winding arranged in a collector circuit. Point contact transistors have relatively instable characteristics, so that such circuit arrangements in view of their low safety of operation have not been employed to any larger extent in electronic computer systems. For achieving the same purpose, multivibrator arrangements including junction transistors have an additional requirement of one transistor for each circuit which, in view of the large number of such circuits in an electronic computer system, must be considered a substantial disadvantage. Also, in such circuits, a current is flowing at all times in one of the two transistors. It has also been proposed that a transistor blocking oscillator type circuit be employed wherein the pulse transformer is replaced by a relay having two windings. However, at present it is necessary in such circuits to use relays of a specific structure to insure that the inductive feedback between the windings is maintained until the relay has been picked up and held through its hold contact.

The arrangement of the present invention eliminates these disadvantages by using a blocking oscillator including a junction transistor and a relay, in which a first relay winding is connected in series with the collector and a second relay winding is connected in a positive feedback polarization with the control electrode of said transistor. A normally closed contact of said relay causes the transistor base to be under control of a blocking bias potential which is turned off immediately at the beginning of the armature stroke by opening the normally closed contacts. Opening of the normally closed contacts renders a second bias potential effective to maintain said transistor in its conductive state and insures that the relay is picked and held. In such an arrangement, the use of special relays is not required because at the start of the armature movement the transistor blocking oscillator is instantly switched into a stable constantly conductive state.

The present invention also finds a useful application in connection with the serial input circuit of a magnetic core signal winding arranged as part of the feedback circuit of the transistor. Such a circuit is advantageous in that immediately after a piece of stored information is read out of the core, the feedback line of the transistor functions immediately to restore the information back into the core. Thus, with a device of this type, it is possible to transfer directly the storage condition of the magnetic cores contained in storage matrix arrangements to a relay and through the relay contacts to influence additional elements, e.g., for controlling a tape punch. A parallel input circuit of a magnetic core signal winding connected to the feedback circuit of the transistor includes the advantage of a particularly low signal pulse amplitude required for reversal while at the same time safely preventing the information just read out of the magnetic core from being re-stored.

Accordingly, a principle object of the present invention is the provision of an improved circuit arrangement wherein a relay may be turned on through a transistor by means of short pulses.

A further object of the present invention is the provision of a relay-transistor blocking oscillator for indicating the storage condition of a magnetic core.

A further object of the present invention is the provision of a blocking oscillator including a junction transistor and relay and novel feedback means for maintaining said transistor in a conductive state.

A still further object of the present invention is the provision of a junction transistor and a relay and novel feedback means controlled by the opening of a normally closed point of said relay for maintaining said transistor in a conductive state.

A still further object of the present invention is the provision of a circuit arrangement wherein a relay may be turned on through a transistor by means of short pulses including a novel feedback circuit for maintaining said transistor in conduction and an input magnetic core circuit connected to said feedback circuit.

Other objects of the invention will be pointed out in the following description and claims and illustrated in the accompanying drawings, which discloses, by way of example, the principle of the invention and the best mode, which has been contemplated, of applying that principle.

Figure 1:
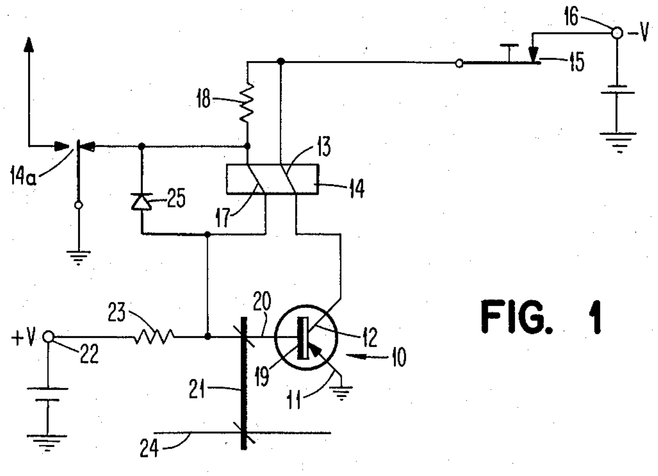
FIG. 1 illustrates a relay-transistor blocking oscillator for indicating the storage condition of a magnetic core with serial input.

Referring to FIG. 1, there is shown a junction transistor 10 having a grounded emitter electrode 11 and a collector electrode 12. The collector electrode is connected to one end of a main winding 13 of a relay 14 with the other end of the winding being connected through a normally closed switch 15 to a negative voltage terminal 16.

In addition to the main winding, the relay also includes an auxiliary winding 17, one end of which is connected through a resistor 18 to the switch 15 and the negative voltage terminal 16. The other end of the auxiliary winding is connected in a positive feedback direction to the base 19 of the transistor through the signal winding 20 of a magnetic core 21. The transistor is normally biased nonconductive, and the relay, therefore, de-energized by means of the bias potential produced from the positive voltage terminal 22, resistor 23 and the resistance of the feedback winding, which together comprise a voltage divider. With the transistor in a nonconductive state, current from the negative terminal 16 will flow through switch 15, the resistor 18 and the normally closed side of transistor contacts **14*a* of relay 14** to ground.

Assuming that the magnetic core 21 contains a stored "1" and thus exists at the upper remanent point of its rectangular hysteresis loop, a read pulse in the winding 24 will switch the core to the other branch of its hysteresis loop. As was previously mentioned, the present invention finds a useful application in connection with the serial input circuit of a magnetic core signal winding arranged as part of the feedback circuit of the transistor. Such an input signal winding is represented by the winding 20 to which, it may be assumed, a suitable pulse has been applied which will drive the core in one direction to represent a "1." The read pulse for the winding 24 is in effect a reset pulse which, as is well known in the art, would be applied to the core to drive the core in a reverse direction so that it will exist at the lower remanent point of its hysteresis loop to represent "0." The resulting reverse saturation and change in flux will cause a negative pulse having a duration of approximately one microsecond to be induced in the winding 20 at the base of the transistor, and this pulse is of an amplitude sufficient to overcome the blocking bias potential produced from the positive terminal 22. A blocking bias potential should be selected which will be of such a magnitude that disturbance pulses produced on the readout of magnetic cores storing a "0" remain ineffective. The negative one microsecond pulse causes the transistor to switch into its conductive condition, and current will flow through the main winding of the relay. Immediately an inductive feedback is generated between the windings of the relay which is maintained until the field of the main winding has reached its full value. The relay armature starts its movement after a slight delay and through the relay contacts 14*a*, which open immediately at the start of the armature movement, the ground potential is now disconnected from the auxiliary winding 17. As a result, the negative voltage of the collector battery or terminal 16 can, through resistor 18, reach the base electrode and maintain the transistor in its conductive state. The transferred side of the contacts 14*a* may simultaneously be used for emitting a signal corresponding to the storage condition of the magnetic core. This may be done, for example, by connecting a suitable voltage source and indicating device, such as a relay or lamp, to the normally open side of the contacts such that the indicating device will be energized upon transfer of the contacts.

By an appropriate selection of the feedback winding 17 of the relay or of the resistor 18 and of the number of turns in the winding 20, it may be achieved that the core just read out through the winding 24 immediately re-stores a "1" by having the feedback circuit supply sufficient current to the winding 20 to again drive the core so that it switches from the lower remanent point of its hysteresis loop back to the top of the loop to again represent a "1." In other words, the core may be driven in one direction to represent a "1" by a suitable input pulse supplying current to winding 20, after which the core may be driven in a reverse direction to represent a "0" by a suitable read or reset pulse supplying current to winding 24, and then the core may be driven back in said first direction to again represent a "1" by the current supplied to the winding 20 by the feedback circuit and, therefore, the information is not lost in the readout operation. Thus, it is possible with the shown arrangement to utilize a magnetic core arranged within a storage matrix directly for emitting a control pulse of any desired magnitude without destroying the information stored in said core in the readout process.

A further improvement to the present circuit arrangement is obtained by bridging the feedback winding with a diode 25. First, in the blocked condition, the voltage existing at the base-emitter path of the transistor is also determined by the gate voltage or voltage drop across the diode which is poled in the forward direction; and secondly, a signal pulse induced in the winding 20 will, through the diode, find a low resistance path to ground free of the inductivity of the feedback winding. Thus, a lower signal voltage out of the winding 20 is sufficient, whereas without the diode 25, the signal pulse reaches ground only through the feedback winding of the relay and the winding capacity parallel thereto. The voltage induced in the feedback winding during the response will, however, load the diode in the blocking direction.

Figure 2:
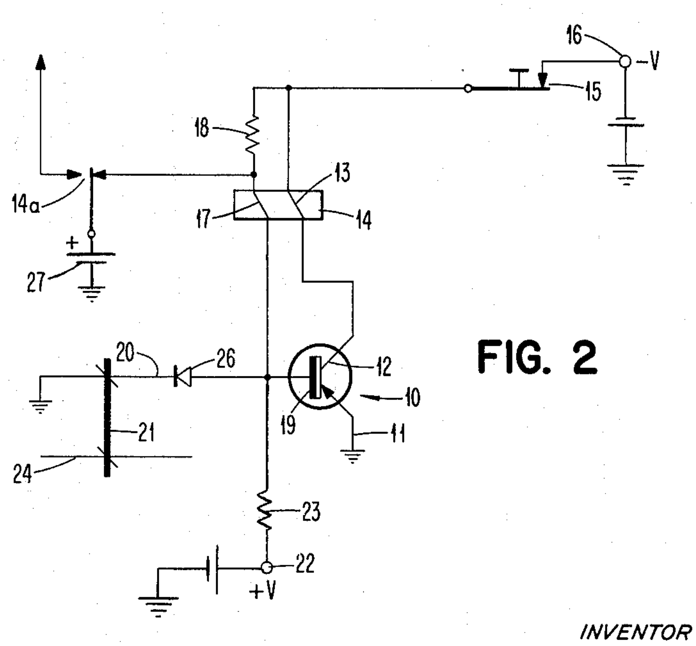
FIG. 2 shows a circuit arrangement according to FIG. 1 with parallel input.

In the circuit shown in FIG. 2, wherein parts corresponding to FIG. 1 are provided with the same reference characters, due to the parallel connection of the input circuit, there is required only a similarly low signal amplitude as in the above-described case for initiating the switching operation. By the diode 26, the feedback current is kept away from the signal winding 20 of the magnetic core 21. An advantageous type of blocking is obtained by not using the resistor 23, as shown in FIG. 1, and instead arranging a positive voltage battery 27 to ground in the line leading to the center strap of the transfer contacts 14*a*. Then, in the inoperative condition, a current will flow through the diode 26 in the forward direction so that, here too, the gate voltage or voltage drop across the diode contributes to determining the blocking voltage of the base-emitter path of the transistor.

The arrangements shown in FIGS. 1 and 2 may be switched back into their inoperative conditions by momentarily opening the switch 15. For particularly high speed switching, it is also possible to design the relay 14 as a magnetostrictive relay. The magnetostrictive relay could be given two separate windings and wired in the circuit in the same fashion as relay 14. Conduction of transistor 10 would supply current through the main energizing coil to cause a magnetostrictive core or rod to mechanically deform and actuate suitable contacts and the inductive coupling back to the second or feedback coil would maintain the rod at its deformed position until the circuit is opened by opening the contacts 15.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A readout device for computer systems comprising a blocking oscillator including a junction transistor and a relay having an armature, said transistor having emitter, collector and base electrodes, a source of ground potential connected to said emitter electrode, a source of bias potential, a first winding of said relay connected in series between said source of bias potential and said collector electrode, a feedback circuit including an impedance element and a second winding of said relay connected in series between said source of bias potential and said base electrode, a source of blocking bias potential connected to said base electrode, normally closed contacts of said relay connected between a source of ground potential and said feedback circuit intermediate said impedance element and said second winding for effectively applying said blocking potential to said base electrode to render said transistor nonconductive, readout means in said feedback circuit for rendering said transistor conductive to effect energization of said relay and opening of said contacts at the beginning of the armature stroke, said first bias potential being applied to said feedback circuit upon opening of said relay contacts to maintain said transistor in its conductive state, and a diode connected in parallel with said second relay winding, said diode providing a gate voltage which contributes to determining the blocking bias potential at the base electrode.

2. A readout device for computer systems comprising a blocking oscillator including a junction transistor and a relay having an armature, said transistor having emitter, collector and base electrodes, a source of ground potential connected to said emitter electrode, a source of bias potential, a first winding of said relay connected in series between said source of bias potential and said collector electrode, a feedback circuit including an impedance element and a second winding of said relay connected in series between said source of bias potential and said base electrode, a source of blocking bias potential, normally closed contacts of said relay connected to said source of blocking bias potential and to said feedback circuit intermediate the impedance element and the second winding for effectively applying said blocking potential to said base electrode to render said transistor nonconductive, a magnetic core winding connected between said ground potential and said base electrode and in parallel with said feedback circuit, said core winding being effective upon a readout of same to render said transistor conductive to effect energization of said relay and opening of said contacts at the beginning of the armature stroke, said first bias potential being applied to said feedback circuit upon opening of said relay contacts to maintain said transistor in its conductive state, and a diode connected between said core winding and said base electrode for preventing feedback current in said feedback circuit from flowing through said core winding.

3. A readout device for computer systems as in claim 2 wherein said source of blocking bias potential comprises a positive voltage battery connected to ground for providing current flow through said diode, said diode providing a gate voltage which contributes to determining the blocking bias potential at said base electrode.

References Cited by the Examiner

UNITED STATES PATENTS

| | | | |
|---|---|---|---|
| 2,120,985 | 6/1938 | Melhose | 317—143 X |
| 2,787,742 | 4/1957 | Fransen. | |
| 2,801,374 | 7/1957 | Svala | 317—155.5 |
| 2,810,080 | 10/1957 | Trousdale | 331—112 |

FOREIGN PATENTS

| | | | |
|---|---|---|---|
| 1,161,135 | 8/1958 | France. | |

SAMUEL BERNSTEIN, *Primary Examiner.*

W. Y. CARLSON, L. M. COLLUM, *Examiners.*

P. A. ROBEY, L. T. HIX, *Assistant Examiners.*